Feb. 23, 1971 TADAO KONISI ET AL 3,565,602
METHOD OF PRODUCING AN ALLOY FROM HIGH MELTING
TEMPERATURE REACTIVE METALS
Filed May 21, 1968

INVENTORS
Tadao Konisi and
Masaaki Teragaki
BY Jucies and Greenside
Their ATTORNEYS United States Patent Office 3,565,602
Patented Feb. 23, 1971

3,565,602
METHOD OF PRODUCING AN ALLOY FROM HIGH MELTING TEMPERATURE REACTIVE METALS
Tadao Konisi, Amagasaki-shi, and Masaaki Teragaki, Ashiya-shi, Japan, assignors to Kobe Steel, Ltd., Fukiai-ku, Kobe, Japan, a corporation of Japan
Filed May 21, 1968, Ser. No. 730,718
Int. Cl. C22d 7/06
U.S. Cl. 75—10                                2 Claims

ABSTRACT OF THE DISCLOSURE

A method of producing a segregation-free highly homogeneous alloy composed of at least two or more of such high melting temperature reactive metals as Ti, Zr, Hf, Nb, Ta, Mo and W and mixtures thereof. In this method both basis metal and alloying metal or metals are reduced to a powder form having a grain size smaller than 50 mesh respectively, then thoroughly mixing the powders of said basis metal and said alloying metal(s), enclosing the resultant mixture in the basis metal for forming into a consumable electrode and melting the consumable electrode in vacuum or in an inert gas atmosphere in a closed vessel.

In general, alloys are required to be free from segregation and homogeneous in structure as is obvious in the light of the purposes which they will serve. Particularly, those alloys which comprise reactive metals having a high melting temperature as a base material are required to be homogeneous more than ordinary alloys as they are used in such critical equipment as chemical equipment, electrical equipment, aircrafts and space equipment. Even a slight non-uniformity in structure of the alloys is highly undesirable from the safety standpoint because it will result in variations in the physical and chemical properties at portions of the alloys and further the segregation created therein provide a cause of cracking of the alloys. However, according to conventional methods no alloy of high melting temperature reactive metal, has ever been produced which is homogeneous more than ordinary alloys. Namely, in melting processes of high melting temperature reactive metals for the production of this type of alloy, the so-called vacuum arc-melting method or electron beam melting method has been employed wherein the reactive metals having high melting temperature are molten in a water cooled copper mold disposed in vacuum or an inert gas atmosphere. With these methods, however, it has been believed to be quite impossible to obtain a substantially homogeneous alloy as compared with the usual producing methods, due to the following physical properties of the high melting temperature reactive metals, in addition to the above-mentioned fact according to said methods the wall of the tank is constantly cooled with water, so that the molten metal in said mold is cooled and solidified from the bottom to top quickly while forming a layer structure. Namely, the melting temperatures of this type of high melting temperature reactive metals vary widely, e.g. titanium has a melting temperature of 1725° C., zirconium 1845° C., tantalum 2996° C., molybdenum 2622° C. and tungsten 3400° C. With respect to the specific gravity thereof these metals also vary largely, e.g. titanium has a specific gravity of 4.54. zirconium 6.5, tantalum 16.6, molybdenum 10.2 and tungsten 19.3. Because of such variations in melting temperature as well as specific gravity of the component metals, it has been difficult to produce homogeneous alloys composed of two or more of these metals. In order to produce alloys of such high temperature reactive metals by melting the following methods have heretofore been employed.

(1) A method wherein an alloying metal or metals provided in the form of a sponge or powder is thoroughly mixed with a basic metal in such proportion as to produce a desired composition of the product alloys and the resultant mixture is molded into a compact shape before melting.

(2) A method wherein an alloying metal or metals which has previously been molten in a form of mother alloy is enclosed in a material basis metal and molded into a compact shape before melting.

(3) A method wherein a mother alloy is prepared beforehand or a powder alloying metal molded into a compact shape is added to a molten basis metal using a special adding means.

(4) A method wherein plates, wires or rods of alloying metals are attached to the exterior wall of an electrode in such amounts as to produce a desired alloy composition and then molten simultaneously.

However, even with the above-described methods, it is difficult, when the melting temperature or specific gravity difference between the basis metal and alloying metal is extremely large, to produce a homogeneous alloy even if these metals belong to all proportional solid solution. Under the described conditions, a more effective and excellent producing method of refractory alloys containing refractory metals has been desired.

The object of the present invention is to produce segregation-free, highly homogeneous alloy at high efficiency by melting high melting temperature reactive metals in a mold using methods, such as, vacuum arc or electron beam, and also to produce an alloy consisting of high melting temperature reactive metals having excellent properties.

In order to achieve the object set forth above, there is provided, according to the present invention, a method of producing an alloy from high melting temperature reactive metals, which comprises providing a predetermined amount of a desired basis metal selected from high melting temperature reactive metals and a necessary amount of alloying metal necessary for producing a desired alloy composition similarly selected from high temperature reactive metals respectively in the form of a powder smaller than 50 mesh, the base metal and alloying metal being selected from the group consisting of Ti, Zr, Hf, Nb, Ta, Mo and W and mixtures thereof, mixing the powders of both metals thoroughly, enclosing the resultant mixture in the core or an axial hollow of the body of an electrode consisting only of the basis metal thereby to compose a consumable electrode and melting the consumable electrode by ordinary arc melting or electron beam melting methods.

High melting temperature reactive metals used in the present invention are titanium, zirconium, tantalum, niobium, molybdenum, tungsten and hafnium. These metals can be used both as a basis metal and as an alloying metal of alloy. The present invention contemplates the production of an alloy of the aforesaid metals by the vacuum arc melting method or electron beam melting method. The method of the present invention will be described more specifically hereunder. First of all, in practicing the method of this invention by employing the vacuum arc melting method, a consumable electrode and a water-cooled annular copper mold are disposed in a closed tank, the interior of which is maintained vacuum. Upon conducting a current, an electric arc is generated between the lower end of the consumable electrode and a material in the casting mold, whereby the consumable electrode is heated by the arc and melts gradually. The molten electrode is solidified in the water-cooled copper mold in a short period of time. In this case, the gap between the level of the molten metal in the water-cooled casting mold and the consumable electrode is maintained suitably by automatic control means. On the other hand, when the electron beam melting method is employed for practicing the present invention, a consumable electrode to be molten is disposed in a high-vacuum tank providing thermo-ionic electron emitting cathode means and a water-cooled copper casting mold therein. An electric current is applied to the cathode means to emit electrons from said cathode means and the consumable electrode is heated and molten by the bombardment of the electrons impinging thereon. The molten electrode drops into the casting mold, wherein it is solidified again. In the manner described above, the melting operation is carried out while maintaining a pool of molten metal in the top portion of the casting mold my subjecting the material in said mold to bombardment by the electrons emitted from the cathode means. The characteristic feature of the present invention resides in the special improvements in the formation of the consumable electrode which is used in the vacuum arc-melting method and the electron beam melting method described above, and not in the melting method per se. To form the consumble electrode, the weights of a basis metal and an alloying metal to be mixed are determined first, based on the composition of a desired alloy and a total amount of melt. All of the alloying metal and suitable part of the basis metal are mixed with each other in the form of powders respectively. The mixing ratio in this case is preferably such that the ratio of the amount of the alloying metal (or the total amount of two or more alloying metals) to the amount of the basis metal is about 50:50, but any other suitable mixing ratio may also be employed. The particle sizes of the metal powders, which are obtained by reducing the individual pure metals, should be smaller than 50 mesh respectively. The alloy powder thus prepared is enclosed in the body of an electrode which is formed with the remaining basis metal. Titanium and zirconium are usually supplied in the form of a spongy mass, tantalum and niobium in the form of a grain or powder and molybdenum, tungsten and hafnium in the form of a fine powder. The remaining basis metal in which the mixed powder is enclosed may be in the form of a mass or grain or fine powder, provided that the electrode can be formed satisfactorily. However, the mixed powder to be enclosed in the electrode must be of a size smaller than 50 mesh. This is for the purpose of facilitating the uniform diffusion of the alloying metal into the basis metal on melting of the electrode and a particle size larger than 50 mesh will result in occurrence of segregation in the mass in the casting mold. However, an extremely small particle size of the metal is undesirable because the handling of the alloy powder during the pressure-molding operation is troublesome and the excessive amount of oxygen contained in the powder will adversely affect the workability of the product alloy. In practice, a particle size in the range from 80 to 400 mesh is preferable. The body of the electrode consisting of the basis metal and enclosing the mixed alloy powder therein is pressed into a compact shape to form a consumable electrode. The consumable electrode may be formed with a plurality of the thus formed unit electrodes connected with each other to a suitable length. The alloy powder enclosed in the body of the electrode should be concentrated in the core or the center of said body so that the alloy powder may not drop out of said body. Any of the following methods may be used for enclosing the mixed alloy powder in the electrode body.

(1) The mixed alloy powder is molded with pressure before it is disposed in the core portion of the electrode body and then the electrode body is pressed with the molded alloy powder therein.

(2) The mixed alloy powder is charged in the core portion of the electrode body as such and then the electrode body is pressed with said alloy powder therein.

(3) The mixed alloy powder is charged in the center of the electrode body and then the electrode body is pressed with said alloy powder therein.

FIG. 1 is a vertical cross sectional view of a compact unit electrode according to the present invention composed of a spongy electrode body 1 and a mixed alloy powder 2 of a basis metal and an alloying metal enclosed in said electrode body 1;

The practical manner of disposing an alloy powder in a basis metal body will be explained hereunder with reference, for example, to a case wherein titanium as being a basis metal is alloyed with a predetermined amount of tantalum, using a titanium sponge as a basic material.

Figure 1:
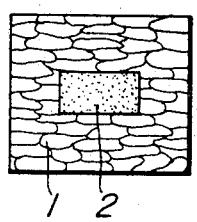
Figure 2:
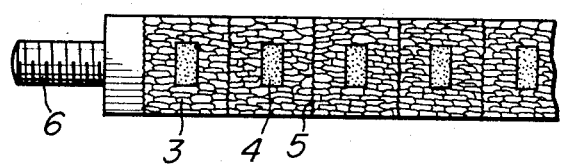
FIG. 2 is a fragmentary vertical cross sectional view of a consumable electrode composed of a plurality of the unit electrodes of FIG. 1 connected with each other by welding, reference numeral 3 representing the electrode body, 4 the mixed alloy powder of the basis metal and the alloying metal, 5 a weld between adjacent unit electrodes and 6 a connecting rod for a power source.

(1) The titanium sponge is reduced to a powder of a size as small as possible below 50 mesh by a suitable method, while tantalum is also reduced to the same size as the titanium, and both powders are mixed with each other thoroughly. In this case, the mixing ratio of the titanium and tantalum is 50% to 50%. After molding with pressure, the resultant molded alloy powder is inserted into the core portion or the axial hollow of an electrode body as shown in FIG. 1 thereby to form a consumable electrode as shown in FIG. 2 and said consummable electrode is molten by the arc melting.

Figure 3:
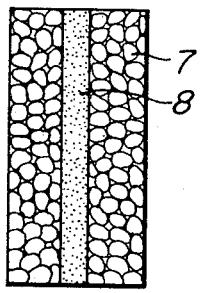
FIG. 3 is a vertical cross sectional view of another form of the unit electrode according to the present invention composed of a spongy electrode body 7 and a mixed fine alloy powder of a basis metal and an alloying metal disposed in an axial hollow of said electrode body.
Figure 4:
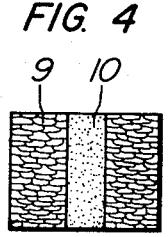
FIG. 4 is a vertical cross sectional view of the unit electrode shown in FIG. 3 after having been molded with pressure into a compact shape, reference numeral 9 representing the electrode body and 10 representing the mixed alloy powder of the basis metal and the alloying metal.
Figure 5:
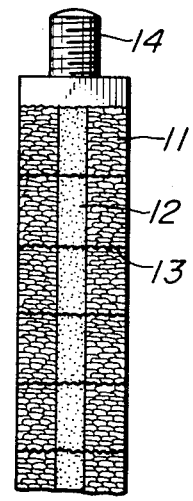
FIG. 5 is a fragmentary vertical cross sectional view of a consumable electrode composed of a plurality of the unit electrodes of FIG. 4 connected with each other by welding, reference numeral 11 representing the electrode body, 12 the mixed alloy powder of the basis metal and the alloying metal, 13 a weld between adjacent unit electrodes and 14 a connecting rod for a power source.

(2) Alternatively, the same alloy powder as in (1) above is charged into the axial hollow of the electrode body consisting of the basis metal, as shown in FIGS. 3, 4 and 5 during the formation of said electrode body, without previously molding the same with pressure, and then the electrode body is compressed with said alloy powder therein thereby to form a consumable electrode.

Now, the present invention will be further illustrated by way of examples thereof.

EXAMPLE 1

In this example, a 280 kg. ingot of 5% Ta-Ti alloy was produced by the arc melting method. Alloy of this type is one of those which can hardly be produced homogeneously by a conventional method as described at the beginning of this specification, due to the fact that, although the alloy forms solid solution in whole range of the component, the melting temperature difference between titanium and tantalum is as great as 1270° C., i.e. the melting temperature of titanium is 1725° C. and that of tantalum is 2996° C., and further the specific gravity difference therebetween is extremely large, i.e. the specific gravity of titanium is 4.5 whereas that of tantalum is 16.6.

First of all, a 270 kg. titanium sponge having a diameter of about 5 mm., 15 kgs. of titanium powder and 15 kgs. of tantalum powder were provided. A small amount of titanium sponge was placed in the bottom of a die having an inner diameter of 130 mm. and a length of 400 mm. A tube of 60 mm. in outer diameter, 50 mm. in inner diameter and 50 mm. in length was erected vertically at the center of the titanium sponge in said die and a mixed powder obtained by mixing the titanium powder and the tantalum powder thoroughly in a mixer was charged in said tube. After filling the interspace between the tube and the die with the titanium sponge, the tube was pulled upwardly and the top surface of the mixed powder was covered with titanium sponge. Then, the titanium sponge was pressed with the mixed powder therein, thereby producing a compact unit electrode having a diameter of 130 mm. and a length of 200 mm.

Seven unit electrodes produced in the manner described above were welded together contiguously to form a consumable electrode of 130 mm. in diameter and 1400 mm. in length. In the manner described, four consumable electrodes were produced. One of these electrodes was disposed in a consumable electro-arc furnace and after flushing the furnace with 100 mm. Hg argon, an electric arc was generated between the electrode and a stub at the bottom of a casting mold (230 mm. in diameter) at a current of 4000 A., whereby the electrode was molten gradually.

Upon completion of the melting of the first electrode in the manner described, the next electrode was molten in the furnace and thus all of the four electrodes were completely molten to obtain an ingot of 230 mm. in diameter and 1600 mm. in length.

The ingot thus obtained was molten again by using it as an electrode in vacuum at a current of 9000 A. and a 280 kg. ingot (320 mm. in diameter and 500 mm. in length) of 5% Ta-Ti alloy was produced.

The alloy ingot was excellent in quality as will be seen from Table 1 below wherein the results of segregation test are shown in comparison with those on the ingots produced by conventional methods.

EXAMPLE 2

Several ingots, each weighing 280 kg., of titanium-molybdenum type alloys of different compositions were produced in the same manner and under the same conditions as mentioned in Example 1. The results of the tests conducted on the individual ingots are shown in Table 2 below.

TABLE 2

[Segregation test results of Ti-Mo type alloys]

| Test | Analysis (Mo percent) Location of sampling | | |
|---|---|---|---|
| | Top | Mid. | Bot. |
| Kind of alloys: | | | |
| Ti-12Mo | 11.7 | 11.8 | 11.8 |
| Ti-15Mo | 15.26 | 15.02 | 15.04 |
| Ti-20Mo | 20.4 | 20.2 | 20.2 |
| Ti-15Mo-5Zr | (Mo) 14.85 | 14.76 | 14.77 |
| | (Zr) 5.11 | 5.21 | 5.00 |

Satisfactory results were also obtained from the other physical tests including gamma-ray radiographic inspection.

As will be apparent from the examples provided above, the present invention enables segregation-free, homogeneous alloys to be produced with ease and is of great industrial advantage.

What is claimed is:

1. A method of producing an alloy from high melting temperature reactive metals, comprising the steps of reducing a basis metal and an alloying metal or metals to a size smaller than 50 mesh respectively, mixing the powders of the respective component metals thoroughly, enclosing the resultant mixture in an electrode body consisting of the basis metal thereby forming into a consumable electrode and melting said consumable electrode by means of electric arc or electron bombardment, the basis metal and alloying metal or metals being selected from the group consisting of Ti, Zr, Hf, Nb, Ta, Mo and W and mixtures thereof.

2. A method of producing an alloy from high melting temperature reactive metals as claimed in claim 1, wherein said basis metal and the alloying metal or metals are reduced to a size ranging from 80 to 400 mesh.

TABLE 1

[Segregation test results of 5% Ta-Ti alloy]

| | Segregation tests | | | | |
|---|---|---|---|---|---|
| | Analysis (Ta percent) Location of sampling | | | Physical segregation test | |
| | Top | Mid. | Bot. | Microscopic examination | X-ray analysis |
| Production methods: | | | | | |
| Present invention | 5.00 | 5.02 | 5.08 | No segregation | No segregation. |
| Conventional method (1) | 2.89 | 4.16 | 4.70 | Flaky segregation at portions of mother alloy. | Segregation in the structure of mother alloy. |
| Conventional method (2) | 3.33 | 4.11 | 5.26 | ___do___ | Flaky segregation of tantalum. |
| Conventional method (2) | 2.88 | 3.71 | 4.05 | Granular segregation at portions of mother alloy. | Granular segregation of tantalum. |
| Conventional method (3) | 4.12 | 4.41 | 3.55 | Granular segregation of tantalum. | Do. |

In Table 1 above, the conventional methods (1), (2) and (3) refer to the following methods:

Conventional method (1): A method which comprises melting an alloying metal into a mother alloy, enclosing said mother alloy in a material basis metal to form a compact electrode and melting said compact electrode.

Conventional method (2): A method which comprises molding a mother alloy of a basis metal and an alloying metal, attaching molded mother alloy to the outer peripheral wall of an electrode body in such a manner as to produce a desired composition and melting said molded mother alloy and said electrode body simultaneously.

Conventional method (3): A method which comprises attaching plates, wires or rods of alloying metals to the outer peripheral wall of an electrode body and melting said plates, wires or rods and said electrode body simultaneously.

References Cited

UNITED STATES PATENTS 2,813,921  11/1957  Vordahl et al. _____ 13—18
3,269,825   8/1966  Vordahl _____ 75—10

L. DEWAYNE RUTLEDGE, Primary Examiner

E. L. WEISE, Assistant Examiner

U.S. Cl. X.R.

75—135, 174, 175.5, 176